United States Patent [19]

Santii et al.

[11] Patent Number: 4,687,389
[45] Date of Patent: Aug. 18, 1987

[54] KEY DUPLICATION MACHINE

[75] Inventors: Robert J. Santii, Milldale; Raymond Aldieri, Plantsville, both of Conn.

[73] Assignee: Lori Corporation, Southington, Conn.

[21] Appl. No.: 851,978

[22] Filed: Apr. 14, 1986

[51] Int. Cl.$^4$ .............................................. B23C 3/35
[52] U.S. Cl. ........................................ 409/81; 409/82
[58] Field of Search ............... 409/81, 82, 83; 33/539, 33/540

[56] References Cited

U.S. PATENT DOCUMENTS

| | | | |
|---|---|---|---|
| 3,276,328 | 10/1966 | Schreiber et al. | 409/81 |
| 3,388,619 | 7/1968 | Schreiber et al. | 409/81 X |
| 3,457,829 | 7/1969 | Crepinsek | 409/82 |
| 3,457,832 | 7/1969 | Adler et al. | 409/81 |
| 4,324,513 | 4/1982 | Hughes | 409/82 |
| 4,325,662 | 4/1982 | Evans | 409/82 |
| 4,553,452 | 11/1985 | Keller | 76/110 |

*Primary Examiner*—Gil Weidenfeld
*Assistant Examiner*—Glenn L. Webb
*Attorney, Agent, or Firm*—Chilton, Alix & Van Kirk

[57] ABSTRACT

A machine for coding or duplicating a pattern of bits onto a key blank employs a locator block which forms reference slots for receiving a key to be duplicated. A template having a matrix of openings which correspond to possible pre-established bit locations is positioned in registration with the key receiving slots. A depth gauge is employed so that a guide selectively seated in a bit defining cut-out of the pattern key indicates the correct incremental depth of the bit to be duplicated. A cutter having a preestablished relationship to the depth gauge guide is employed to obtain the correct cutting depths for the key blank bits.

23 Claims, 5 Drawing Figures

KEY DUPLICATION MACHINE

BACKGROUND OF THE INVENTION

This invention relates generally to the coding and duplication of keys. More particularly, this invention relates to machines for copying a pattern of dimples onto a key blank with or without a pattern key.

Locking systems employing keys which are bitted with patterns of dimples commonly function to provide a high level of security. The dimple configurations facilitate multiple levels of master keying. Exemplary dimple patterns are configured in rows of dimples disposed at preselected locations from a reference position on the key with each dimple having a preselected incremental depth. In order that the key may be operative regardless of which side is inserted in the keyway of a cooperating lock as the "up" side, opposing side surfaces of the key blade may have identical patterns comprising a right row and left row of dimples. The narrow key edges between the opposing surfaces may also include a row of dimples. The rows of dimples of the side surfaces may be oriented at a constant acute angle to the surface to facilitate key control.

Duplication of such aforedescribed keys on conventional key machines has been problematical due to difficulties in accurately locating the positions of the dimples, difficulties in cutting the correct incremental depths of the dimples and also difficulties in correctly duplicating the acute angular orientation of the dimples. The problems in duplicating the dimple patterns are increased when duplicates are made from second generation and later generation duplicate keys or from old keys or from keys or duplicate keys which have been inaccurately made on conventional key machines. Accordingly, the present invention is directed to a new and improved key machine which is particularly adapted for keys configured with dimple patterns as hereinbefore described.

SUMMARY OF THE INVENTION

Briefly stated, the invention in a preferred form is a new and improved key duplicating and coding machine for making a pattern of dimples onto a key blank from a pattern key, i.e., a previously produced key, or a document which identifies the coding. The key duplicating and coding machine comprises a variably positionable table. A pattern key receiver is mounted to the table for receiving a pattern key. The receiver includes a frame which forms a slot for receiving the pattern key and for defining a first reference orientation of the pattern key. A template forms a matrix of openings corresponding to possible dimple locations for the pattern key for the first reference orientation. A key blank vise is mounted to the table for clamping a key blank in a fixed orientation relative to the table so that the pattern key and the clamped key blank are essentially disposed in generally parallel relationship. A vertically positionable guide having a diameter which is less than the corresponding diameter of the dimples of the pattern key is adapted for selective positioning in the openings of the template and seating in a corresponding dimple of the pattern key upon suitable selective positioning of the table. A cutter is disposed in a fixed spatial relationship relative to the guide so that when the guide is positioned at a selective location of the pattern key, the cutter aligns with a corresponding location of the key blank. A lever is displaceable to selectively seat the guide in a reference dimple of the pattern key. A depth indicator indicates the reference depth of the dimple. The cutter is then lowered by means of a lever or other means for cutting engagement into the key blank to cut a duplicate dimple having the same reference depth and location as the pattern key reference dimple.

In a preferred form, the pattern key receiver has three pattern key slots for slidably receiving the pattern key at each of three reference orientations wherein dimples of the pattern key align with selected openings of the template. The pattern key slots are correspondingly oriented at a pre-established uniform acute angle corresponding to the acute angle of the axes of the dimples relative to the pattern key surface. The key blank vise also includes three slots having orientations corresponding to the respective pattern slots. The template preferably has three rows of uniformly spaced openings with each row being aligned with a corresponding pattern key slot.

The guide and the cutter are positioned at pre-established vertical positions above the table. The depth duplication assembly further includes a lost motion mechanism so that in a locator mode, the guide is seated in a dimple of the pattern key with the cutter out of engagement with the key blank, and in the cutting mode, the guide is seated in the dimple and the cutter is vertically lowered for cutting the duplicate dimple in the key blank. The pre-established vertical positions differ by a linear dimension which is greater than the maximum depth of a pattern key dimple. The depth indicator includes an indicator dial which is graduated in units corresponding to possible dimple depth increments or linear depth units such as thousandths of an inch or 0.02 mm.

An object of the invention is to provide a new and improved key machine for duplicating or coding a key having a pattern of dimples.

Another object of the invention is to provide a new and improved means for precisely locating the position of a duplicate dimple to be cut into a key blank.

Another object of the invention is to provide a new and improved key machine for accurately duplicating the incremental depth of a dimple into a key blank.

A further object of the invention is to provide a new and improved key machine which may be efficiently employed for readily identifying errors of a pattern key and correctly duplicating a corrected dimple pattern onto a key blank.

A yet further object of the invention is to provide a new and improved key machine for accurately cutting a pattern of dimples onto a key blank by coding means.

Other objects and advantages of the invention will become apparent from the drawings and the specification.

DETAILED DESCRIPTION OF THE INVENTION

Figure 2:
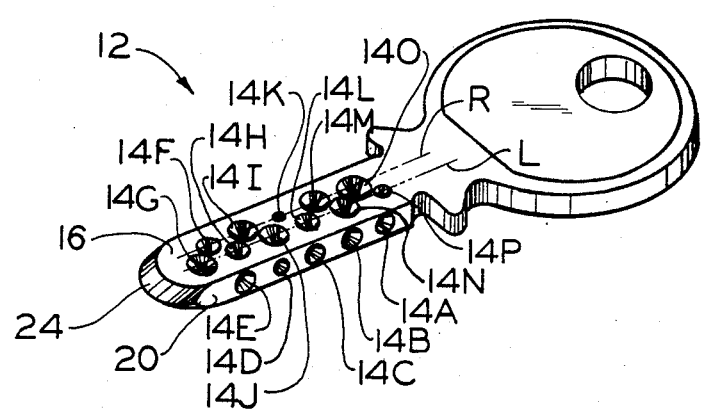
FIG. 2 is a perspective view of a pattern key which may be employed in the key machine of FIG. 1.

With reference to the drawings wherein like numerals represent like parts throughout the several figures, a key machine in accordance with the present invention is generally designated by the numeral 10. Key machine 10 is particularly adapted for duplicating and coding keys which are bitted with a pattern of dimples. An exemplary key 12 is illustrated in FIG. 2. Key 12 has a pattern of dimples 14A, 14B, 14C, . . . formed in the opposing side surfaces 16 and 18 and the edge 20. The dimples extend into the surface of the key along the key blade, the dimples having preselected incremental depths. Two sets or rows of dimples designated by the letters R and L are formed in the key opposite side surfaces 16 and 18 (not visible in FIG. 2). The central axes of the dimples extend through surfaces 16 and 18 and are also oriented relative to these generally planar surfaces at a pre-established acute angle (for example, 15 degrees) relative to an intersecting normal line to the longitudinal centerline of the key to provide for enhanced key control. The dimples are located at preselected linear positions along the rows between the bow 22 and the tip 24 of the key with the key stop shoulders 23 defining a reference position. The possible positional locations of the dimples are preferably uniformly spaced along each row.

Conventional key machines adapted for duplicating keys having a pattern of dimples, as described, exhibit deficiencies in attaining requisite accuracy in the location, the depth and the angular orientation of the duplicated dimples. Key machine 10 is specifically adapted to provide an efficient and accurate means for duplicating or coding a type of key such as key 12 although it should be understood that the invention is not limited to a key having the specific foregoing configuration.

Key machine 10 generally comprises a self-supporting, upright rugged housing 30 which generally vertically extends from a lower forwardly projecting support base 32 to an upper forwardly projecting head 34 which is disposed above the base. A lever 36 at the side of head 34 is selectively manually rotatable for lowering a guide assembly, indicated generally by the numeral 35, and a following cutter assembly, indicated generally by the numeral 37, toward the support base in a manner somewhat similar to that employed for a conventional drill press as will be further described below.

Figure 1:
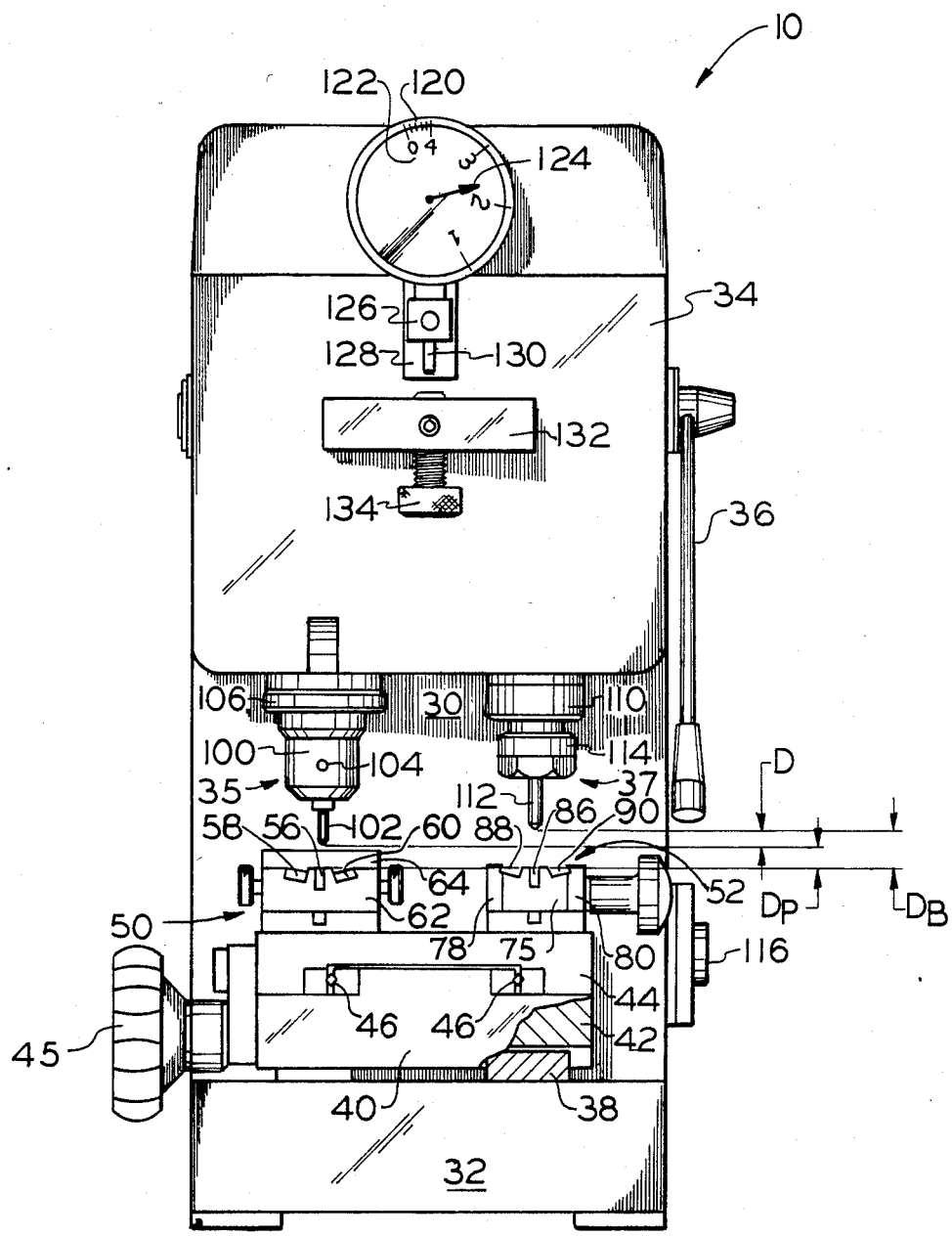
FIG. 1 is a front view, partly broken away, of a key machine in accordance with the present invention.

A pair of transversely extending parallel rails 38 are mounted at the top of a platform formed at the upper surface of the support base 32. A table 40 is slidably received on the rails for selective transverse positioning relative thereto (to the left and right in FIG. 1). Table 40 is bifurcated to form a lower carriage 42 and an upper table 44. A pair of laterally extending tracks 46 vertically disposed above rails 38 extend transversely to the rails 38 to provide a laterally sliding relationship (in a direction normal to the plane of the FIG. 1 drawing) between the upper table 44 and the carriage 42. The upper surface of upper table 44 is a generally horizontally disposed planar surface which may be selectively positioned at a plurality of locations defined by the plane of the surface due to the cooperative transverse and lateral positioning provided by rails 38 and tracks 46, respectively. A positioning wheel 45 may be rotated to position the upper table 44 and carriage 42 in a fixed transverse and lateral position relative to the base 32.

Figure 3:
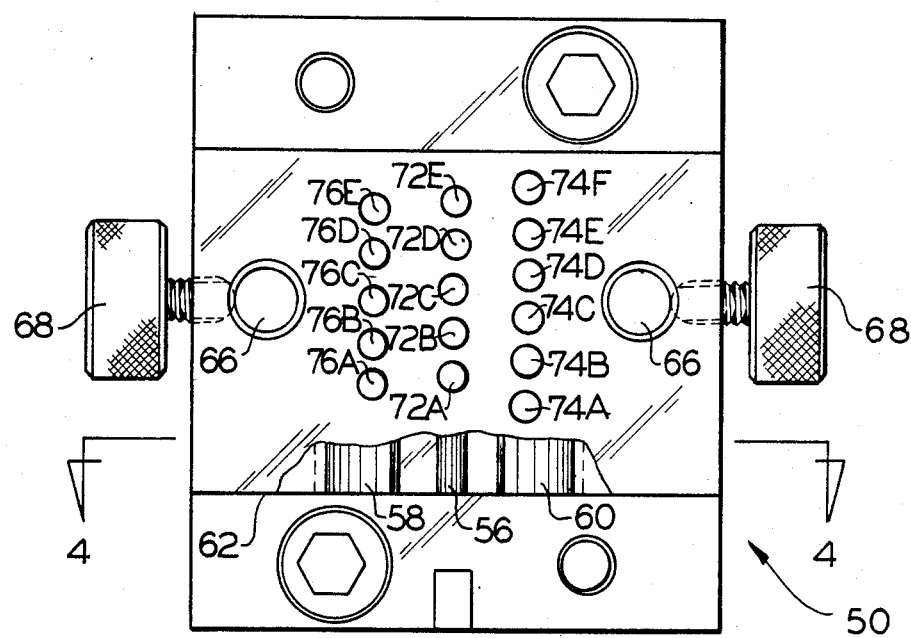
FIG. 3 is an enlarged fragmentary top plan view, partly broken away and partly in phantom, illustrating a pattern key locator assembly employed in the key machine of FIG. 1.
Figure 4:
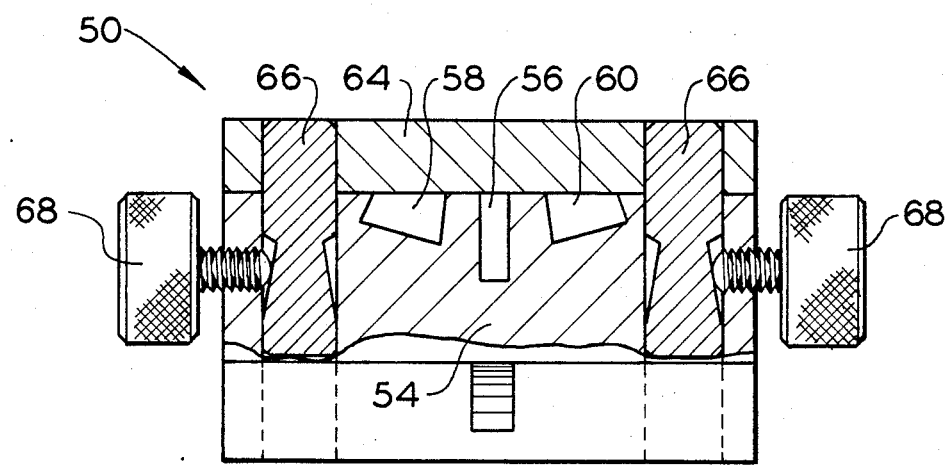
FIG. 4 is a front sectional view of the pattern key locator assembly taken along the line 4—4 of FIG. 3.

A pattern key locator 50 for holding the pattern key to be duplicated and a corresponding key blank vise 52 for holding the key blank to be cut are each mounted in fixed spaced positions at the top of the upper table 44. With reference to FIGS. 3 and 4, pattern key locator 50 comprises a block 54 which is configured to form three laterally extending slots, e.g. a central upright slot 56 and a pair of angularly disposed side slots 58 and 60. Center slot 56 is dimensioned to closely slidably receive the blade of key 12 until the key stop 23 formed by the rear edge of the bow 22 engages the front surface 62 of block 54 so that surface 62 functions as a reference stop. Likewise, left slot 58 and right slot 60 are each dimensioned and configured to closely slidably receive the blade of key 12 with the key stop 23 being engageable against surface 62. In the illustrated embodiment, a key inserted in slot 58 or 60 is oriented at an angle of 15 degrees relative to the horizontal plane due to the angular disposition of the lower surfaces defining the slots.

A rectangular locator template 64 overlies block 54 and is demountably secured in place by a pair of retention dowels 66. A pair of knob screws 68 are threaded through opposite sides of the block 54 for threadably engaging the dowels 66 for securing the template in position. The locator template 64 has a matrix of openings which are of substantially equal diameter with the diameter being slightly greater than the maximum diameter of the guide of the guide assembly 35 as will be described hereinafter. Openings 72A–E correspond to the possible locations of the dimples along edge 20 of key 12 with the surface 62 or the front edge of the locator defining the standard reference position. Openings 74A–F correspond to the possible dimple locations on row L. Likewise, openings 76A–E correspond to the possible dimple locations on row R of the key 12. In the illustrated embodiment of template 64 the openings in each row are uniformly spaced and arranged in staggered relationship with the openings of the other rows to correspond to the possible dimple locations of exemplary key 12. It will thus be appreciated that upon the insertion of key 12 into one of slots 56, 58 or 60 and the abutting engagement of reference key stop 23 against surface 62, each of the possible dimple locations in the pattern key for a corresponding row are precisely located by the corresponding row of openings in the template 64.

Key blank vise 52 comprises a bed 75 which is mounted in fixed position to the upper table 44. Bed 75 is disposed between a pair of transversely movable jaws 78 and 80 which may be adjustably tightened for clamping engagement by a knob screw 82. Bed 75 is configured at an upper central portion to form a central slot 86 having cross-sectional dimensions substantially commensurate with the corresponding dimensions of center slot 56 of pattern key locator 50. Bed 75 is oriented in parallel relationship to center slot 56 at substantially the same distance from the upper surface of the upper table 44. Jaw 78 cooperates with the outer upper portion of bed 75 to form a left slot 88 which has substantially the same cross-sectional dimensions as slot 58 and is substantially parallel to slot 58. Similarly, jaw 80 cooperates with the upper outer portion of bed 75 to form a right slot 90 which has substantially the same cross-sectional dimensions as slot 60 and is substantially parallel to slot 60. Slots 86, 88 and 90 are equidistantly spaced from their corresponding slots 56, 58 and 60, respectively, of the pattern key locator. The foregoing slots are adapted for receiving a key blank (not illustrated) which is to be cut as a duplicate to a pattern key (such as key 12) received in the pattern key locator or cut in accordance with a code. The key blank preferably has the same general form as the pattern key. The jaws function to clamp the key blank in a fixed firm position to provide sufficient stability for accomplishing the cutting. The front face of the bed 75 adjacent the forward terminus of the slots 86, 88 and 90 functions as a reference guide for abutting engagement by the reference bow edge of the key blank in a manner similar to that for the reference surface 62 of the pattern key locator.

The guide assembly 35 is downwardly displaceable from a normal unactuated position for seating in a locator mode in a selected dimple of the pattern key upon rotation of lever 36. Guide assembly 35 includes an arbor 100 which extends downwardly from the forward underside of head 34 for mounting a guide 102. A set screw 104 secures the guide 102 to the arbor. An adjusting collar 106 on the arbor provides a means for rotatably adjusting the vertical height or lowermost extent of the guide. The guide is dimensioned so that the guide may be accommodated in the openings of the locator template 64 upon suitable transverse and lateral positioning of the template and vertical positioning of the guide. In preferred form, the tip diameter of the guide is dimensioned to be somewhat less than the corresponding diameter of the dimples of the pattern key or the corresponding dimension of the cut to be duplicated.

The cutter assembly is also downwardly displaceable from a normal unactuated position to a position of nonengagement with the key blank in the locator mode and to a position for cutting engagement with the key blank upon suitable manipulation of lever 36. Cutter assembly 37 includes a spindle 110 extending downwardly from an opposing underside location of the head 34 for receiving a drill bit or cutter 112 which is secured in place by a collet nut 114. The cutter 112 is rotatably driven by a motor (not illustrated) within the housing which is electrically energized by a switch 116 located at the side of the housing. The cutter is dimensioned and configured for duplicating the corresponding dimples formed in the pattern key and making code original keys and accordingly has a diameter and a tip configuration which corresponds to the diameter and configuration of the foregoing dimples. In the embodiment and machine mode illustrated in FIG. 1, the tip of the cutter 112 is disposed at a vertical height D (which may, for example, be 0.100 inches) above the corresponding tip of the guide 102. When machine 10 is in the unactuated mode, the vertical distance $D_p$ between the upper surface of a pattern key in locator 50 and the lower tip of guide 102 is less that the vertical distance $D_B$ between the upper surface of a key blank in a corresponding slot of vise 52 and the lower tip of cutter 112 by the pre-established distance D. The operation of the machine in relation to distance D is described in further detail below.

Figure 5:
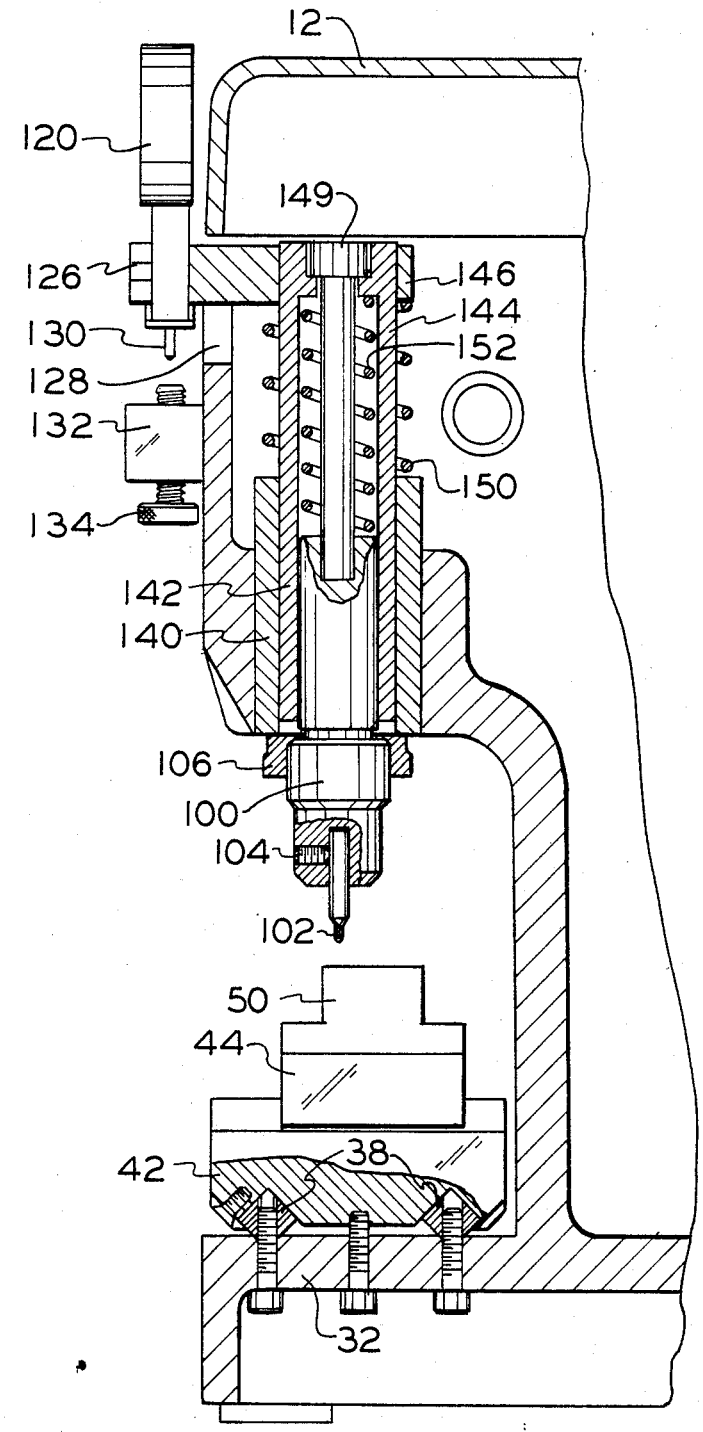
FIG. 5 is a fragmentary interior side sectional view, partly in section, partly broken away and partly in phantom, of the key machine of FIG. 1.

The foregoing guide and cutter assemblies may be vertically lowered and releasably raised in tandem by means of lever 36 subject to a lost motion mechanism in the guide assembly as illustrated in FIG. 5. A guide sleeve 140 is fixably mounted at the underside of the housing head for slidably receiving a vertically displaceable drive sleeve 142. A coil spring 144 encircles sleeve 142 and is seated between the end of sleeve 140 and a collar 146 proximate the top of sleeve 142 to normally bias sleeve 142 and hence the guide assembly to an upper rest or inactive position. A release rod 150 having a lower enlarged diameter section and an upper reduced diameter section is received in sleeve 142. The enlarged section connects at its lower terminus with arbor 100. A coil spring 152 encircles the reduced section of the release rod and biases against an interiorly formed collar 149 of the sleeve and the enlarged rod section. The release rod 150 and the drive sleeve 142 are vertically displaced in tandem by a downward force exerted on sleeve 142 until the resistance force exerted against the guide upon being seated in a dimple collapses spring 152 to release the release rod/sleeve engagement to provide a lost motion mechanism preventing further downward displacement of the guide.

A depth dial 120 protruding from the forward face of the head is used to determine the depths of the dimples in the pattern key and also to accurately cut duplicate or original dimples having the correct incremental depths into the key blank which is received in the key blank vise. Accordingly, the dial 120 is affixed with an indicia wheel 122 which is graduated to correspond to the possible incremental depths of the dimples to be cut into the key blank. An angularly positionable indicator needle 124 is responsive to the vertical displacement of the guide below a reference threshold to indicate the dimple depth. In the preferred illustrated embodiment, the pattern key may be formed from dimples having four possible depths in increments of 0.0138 inches. The dial is preset so that a vertical displacement of distance D results in one complete revolution of the needle 124. The indicia wheel 122 may be replaced and the dial recalibrated to correspond with the possible incremental depths for a given key system.

A mounting arm 126 connects at an upper end of sleeve 142 and extends forwardly through a slot 128 formed in the housing to provide a mount for the depth dial 120. An actuator pin 130 extends vertically from the bottom of dial 120 through the mounting arm. A mounting block 132 is bolted to the front face of the head below the indicator dial 120. A calibration screw 134 is threadably mounted in block 132 in axial alignment with actuator pin 130 for calibrating a depth reference value for the depth dial. The dial is carried by the arm so that the initial engagement of the ends of pin 130 and screw 134 define the reference depth. As the guide assembly is downwardly displaced beyond the reference engagement, the vertical inward displacement of pin 130 relative to dial 120 is translated into a proportional angular displacement of the indicator needle for measuring the dimple depths.

A duplicate key 12 may be cut by the key machine 10 in accordance with the present invention by slidably inserting a pattern key such as key 12 into center slot 56 until the key engages the reference surface 62 of the locator block 54, the edge 20 being disposed at the top of the inserted key. A key blank for the pattern key is similarly inserted into the center slot 86 and clamped in place. The table 40 is then selectively manually positioned so that the guide 102 vertically aligns with an opening 72 which opening likewise aligns with a corresponding dimple 14 formed in the edge 20. The cutter assembly is energized. Lever 36 is rotated so that the guide extends into the opening until the tip of the guide 102 is seated in the corresponding dimple of the pattern key. The needle 124 on the indicator dial indicates the corresponding incremental depth of the dimple. It should be appreciated that the pattern key may have a conventional bitting rather than the described dimple pattern in which case the needle indicates the bitting depth.

The guide and cutter assemblies are generally downwardly displaced in tandem by a conventional returnable positioning mechanism (not illustrated) subject to the described lost motion mechanism in the guide assembly. Upon encountering the resistance of spring pressure exerted by spring 152 through the lever 36, the depth dial is read, and the lever is then rotated until the needle 124 turns another complete revolution and reaches exactly the same depth number as previously indicated on the depth dial. It will be appreciated that for one revolution of the needle 124, the cutter has been vertically displaced a distance D due to the previously described calibration of the depth dial 120. The energized cutter has thus made a cut which corresponds in location and depth to the dimple of the pattern key.

The foregoing process is continued for each of the corresponding dimples in the edge 20 of the pattern key. After the foregoing duplicate dimples have been cut in the key blank, the pattern key is then removed from the center slot and placed in the left slot 58. The key blank is also moved to the corresponding left slot 88 and clamped in place. It should be appreciated that the dimples in row L of the pattern key align with the openings 74 of the locator template. Table 40 is thus positioned so that the guide 102 aligns with a dimple of row L of surface 16. The lever is then rotated until the guide engages the lower end of the corresponding dimple which engagement or seating is sensed by the encountering of spring pressure through the lever. The depth gauge indicator is duly noted by the operator and the lever is then correspondingly rotated until the indicator needle 124 makes one revolution and aligns with the same indicator depth as previously indicated for the pattern dimple. The duplicate dimples are then repeated for each of the dimples for the surface 16. The key blank may then be reversed and reinserted into the vise so that the uncut surface of the key blank corresponding to obverse surface 18 is the upper surface. The locating and cutting procedure is then repeated for the dimples in row L.

The key is then removed from the left slot 58 and inserted into the right slot 60 in an orientation wherein surface 16 is the upper surface. The key blank is then also accordingly reinserted into the corresponding right slot 90 of the blank vise and clamped in place. The table 40 is positioned so that the guide aligns with a dimple formed in row R of surface 16. The guide is correspondingly lowered by downwardly displacing the lever 36 to seat the guide in the dimple, and the depth dial is read to determine the depth of the dimple in the pattern key. The lever is rotated until the needle rotates one revolution from the indicated depth and aligns with the indicated depth of the pattern key. The latter procedure is repeated for each dimple of row R. Again, the upper key blank surface is reversed, the key blank reinserted into the corresponding right slot, and the duplication procedure repeated. It will be appreciated that the locator template provides a means for precisely locating the position of the duplicate dimple to be cut into the key blank. The correct angular orientation of the duplicate dimples is obtained by the pre-established angular relationships of the pattern key slots and the key blank slots. The depth dial 120 provides a means for precisely measuring the depth of each dimple of the pattern key and identifying any errors in the pattern key depths in the event that the indicator needle does not align with one of the incremental depth graduations on the indicia wheel. Thus, the dimple cut in the key blank will actually be a corrected "duplicate" dimple.

The locator template 64 may be configured so that in the event that the pattern key is a composite bitted key having two substantially continuous rows of dimples at each surface, the template 64 may be loosened and reversed and the foregoing steps repeated for the composite key or a right hand key rather than the illustrated left hand key 20.

It should also be appreciated that a key could be made by a coding process wherein the key blank is inserted into the key blank vise and the cuts are made at given code depths and positions by sequentially aligning the guide with the locator openings in the template and cutting the dimples into the key blank at the incremental coded depths indicated on the depth dial. The code depths are accurately obtained by use of the depth dial 120. The code positions are accurately obtained by selectively aligning guide 102 with corresponding openings of template 64. A pattern key is not required for cutting coded original keys in accordance with the invention.

A particular advantage of the foregoing key machine 10 is that an accurate duplicate key may be cut even though the pattern key is a second generation key with a number of errors due to variations from inaccurate duplication of an original key. For example, if the incremental depth of the dimple is slightly incorrect, the depth dial will identify the correct dimple depths at which the duplicate key is to be cut. In addition, if the location of a dimple is incorrect, the template will correctly set the location of each of the duplicate dimples. Thus, the "duplicate" key may be more accurate than the pattern key and consequently need not replicate the errors made in the pattern key. Naturally, key machine 10 may also be employed to duplicate or code nondimple type key cuts.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. Apparatus for the formation of keys from key blanks comprising:
   a movable table;
   receiver means mounted on said table for supporting a key to be duplicated, the key having a blade with a bit pattern defined by a plurality of regions from which material has been removed, said receiver means supporting the key in at least a first orientation;
   template means for defining the correct location of regions which may comprise the bit pattern of the key to be formed, said template means being mountable on said table in registration with said receiver means;
   vise means mounted on said table for receiving and supporting a key blank, the key blank including a blade portion having a size and shape commensurate with the size and shape of the blade of the key to be formed, the key blank being supported so as to be oriented parallelly with respect to a key supported by said receiver means;

locator means, said locator means and said table being relatively movable to align said locator means with said template means, said locator means including a sensor member which is reciprocally movable with respect to said receiver means independently of said relative motion whereby contact may be established between said sensor member and a bit pattern defining region on the blade of a key supported by said receiver means, said sensor member being guided into contact with a supported key by said template means;

indicator means coupled to said locator means for indicating the depth of pattern bit defining regions of the blade of a key supported by said receiver means which are contacted by said sensor member;

cutter means for selectively removing material from a key blank supported in said vise means, said cutter means being reciprocally movable relative to said vise means and being coupled to said indicator means, said cutter means being registrable with said vise means, said cutter means and locator means sensor member being initially positioned with different pre-established spacings from said table; and actuator means for imparting motion to said locator means sensor member and to said cutter means whereby material may be removed from the blade of a key blank supported in said vise means at locations determined by said template means and the amount of material removed at each location may be a function of the depth indication provided by said indicator means, said actuator means including lost motion means so that in a locator mode the locator means sensor member may be seated in a pattern defining region of a key supported by said receiver means and said cutter means will be out of engagement with the key blank, and in a cutting mode the locator means sensor member may be seated in a pattern bit defining region of the blade of a key supported by said receiver means and the cutting means will engage the key blank.

2. The apparatus of claim 1 wherein said locator means sensor member comprises an axially extending guide having a diameter which is less than the pattern defining regions of a key to be duplicated.

3. The apparatus of claim 1 wherein said receiver means is provided with plural slots for slidably receiving a previously formed key to be duplicated in plural different orientations.

4. The apparatus of claim 3 wherein the blade of the key to be duplicated has a pair of opposed side surfaces and at least one side surface of the key blade is provided with bit defining recesses which are oriented at a uniform acute angle with respect to planes defined by the key side surfaces and wherein one of said receiver means key receiving slots supports a key at said acute angle.

5. The apparatus of claim 4 wherein said vise means is provided with plural key blank receiving slots and one of said vise means slots corresponds to said receiving means angularly oriented slot so that a key disposed in said angularly oriented receiver means slot is substantially parallel to a key blank in said corresponding vise means slot.

6. The apparatus of claim 1 wherein said receiver means and said vise means each define a reference edge for respective engagement by projections on a key and a key blank to define reference positions respectively for a key to be duplicated and a key blank into which a bit pattern is to be cut.

7. The apparatus of claim 4 wherein said template is provided with at least one row of openings in alignment with each receiver means slot.

8. The apparatus of claim 1 wherein the pre-established vertical positions differ by a linear dimension greater than the maximum depth of a pattern bit defining region.

9. The apparatus of claim 8 wherein said indicator means comprises an indicator dial which is graduated in units corresponding to possible pattern bit defining region depth increments.

10. The apparatus of claim 9 wherein the indicator dial indicates the penetration distance of said cutter means into the key blank.

11. The apparatus of claim 9 wherein said indicator dial comprises a rotatable indicator needle with one revolution of said needle corresponding to said cutter means being vertically displaced by a distance equal to the indicated depth unit.

12. The apparatus of claim 1 further comprising:
means for removably mounting said template means on said receiver means.

13. The apparatus of claim 12 wherein said template means is provided with a matrix of apertures which define the correct location of bits which may comprise the bit pattern of the key to be formed.

14. The apparatus of claim 13 wherein the key to be formed has a bit pattern defined by spatially separated recesses in plural surfaces and wherein said receiver means is provided with plural slots for slidably receiving a previously formed key which is to be duplicated respectively in different orientations so that bit defining recesses of the key align with apertures of said template means.

15. The apparatus of claim 14 wherein at least one surface of the key blade is provided with bit defining recesses which are oriented at a uniform acute angle with respect to a plane defined by a key side surface and wherein one of said receiver means key receiving slots supports a key at said acute angle.

16. The apparatus of claim 15 wherein said vise means is provided with plural key blank receiving slots and one of said vise means slots corresponds to said receiving means angularly oriented slot so that key disposed in said angularly oriented receiver means slot is substantially parallel to a key blank in said corresponding vise means slot.

17. The apparatus of claim 16 wherein said receiver means and said vise means each define a reference edge for respective engagement by projections on a key and a key blank to define reference positions respectively for a key to be duplicated and a key blank into which a bit pattern is to be cut.

18. The apparatus of claim 14 wherein the pre-established vertical positions differ by a linear dimension greater than the maximum depth of a pattern bit defining recess.

19. The apparatus of claim 18 wherein said indicator means comprises an indicator dial which is graduated in units corresponding to possible pattern bit defining recess depth increments.

20. The apparatus of claim 14 wherein said locator means sensor member comprises an axially extending guide having a diameter which is less than the pattern defining regions of a key to be duplicated.

21. The apparatus of claim 19 wherein said locator means sensor member comprises an axially extending guide having a diameter which is less than the pattern defining regions of a key to be duplicated.

22. The apparatus of claim 21 wherein at least one surface of the key blade is provided with bit defining recesses which are oriented at a uniform acute angle with respect to a plane defined by a key side surface and wherein one of said receiver means key receiving slots supports a key at said acute angle.

23. The apparatus of claim 22 wherein said vise means is provided with plural key blank receiving slots and one of said vise means slots corresponds to said receiving means angularly oriented slot so that a key disposed in said angularly oriented receiver means slot is substantially parallel to a key blank in said corresponding vise means slot.

* * * * *